(12) United States Patent
Chowdhury

(10) Patent No.: US 6,260,820 B1
(45) Date of Patent: Jul. 17, 2001

(54) VALVE WITH ROTATABLE VALVE MEMBER AND METHOD FOR FORMING SAME

(75) Inventor: Mizanul H. Chowdhury, Sulphur Springs, TX (US)

(73) Assignee: Nordstrom Valves, Inc., Sulphur Springs, TX (US)

( * ) Notice: Subject to any disclaimer, the term of this patent is extended or adjusted under 35 U.S.C. 154(b) by 0 days.

(21) Appl. No.: 09/316,817

(22) Filed: May 21, 1999

(51) Int. Cl.$^7$ ...................................................... F16K 5/06
(52) U.S. Cl. .................... 251/287; 251/293; 251/315.05; 251/315.16
(58) Field of Search .................................... 251/286, 287, 251/288, 293, 315.01, 315.05, 315.16

(56) References Cited

U.S. PATENT DOCUMENTS

| | | | | |
|---|---|---|---|---|
| 1,331,025 | * | 2/1920 | Riggin | 251/315.16 X |
| 2,511,477 | * | 6/1950 | Mueller | 251/286 X |
| 3,270,772 | * | 9/1966 | Rakus | 251/315.16 X |
| 3,726,299 | * | 4/1973 | Wheatley, Jr. | 251/287 X |
| 4,180,542 | | 12/1979 | Wrasman | 264/242 |
| 4,331,178 | * | 5/1982 | Handley et al. | 251/293 X |
| 4,511,120 | * | 4/1985 | Conlet et al. | 251/288 |
| 5,115,833 | * | 5/1992 | Himle | 251/287 X |
| 5,685,339 | * | 11/1997 | Lee | 251/287 X |

FOREIGN PATENT DOCUMENTS

| | | | |
|---|---|---|---|
| 955194 | 4/1964 | (DE) . | |
| 0 297 382 | 1/1989 | (EP) | F16K/5/06 |

OTHER PUBLICATIONS

Catalog article LYCO (R.W. Lyall) Molded In–Place Ball Valve.
Copy of International Search Report for PCT/US 00/13910.
Catalog article British Gas TransCo Technical Specification for Distrubution Valves Part 2—Plastics Bodied Valves of Size up to 63 mm Suitable for Operation at Pressures not Exceeding 5.5 bar (Sep. 1995).

* cited by examiner

Primary Examiner—Kevin Shaver
Assistant Examiner—John Bastianelli
(74) Attorney, Agent, or Firm—Myers Bigel Sibley & Sajovec

(57) ABSTRACT

A method of producing a valve includes the steps of: providing a mold comprising a pair of mating mold halves, with each of the mold halves including a mold cavity; providing a valve member-stem unit comprising a valve member of substantially circular cross-section attached to a stem, with the valve member including a passageway extending therethrough in a direction generally normal to the stem; inserting a mold core into the passageway of the valve member-stem unit to form a mold insert assembly; positioning the mold insert assembly within the cavity of a first of the mold halves; positioning a second of the mold halves in adjacent contacting relationship with the first mold half such that the mold insert assembly is located within the mold cavities of the first and second mold halves; injecting a polymeric material into the mold half cavities such that a valve casing forms around and captures the valve member-stem unit; and removing the valve casing, the valve member-stem unit and the mold core from the mold halves. With this method, the casing of the valve can be formed around the ball-stem unit during molding so that the product of the molding steps is ready for use.

17 Claims, 13 Drawing Sheets

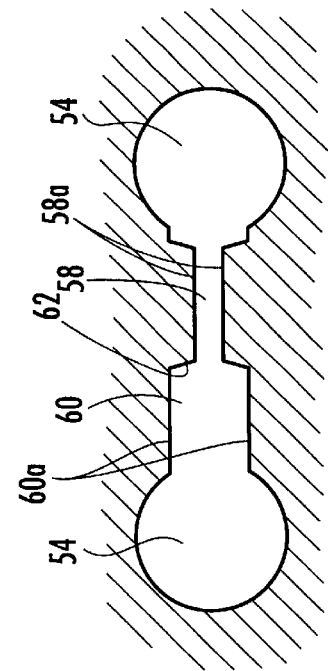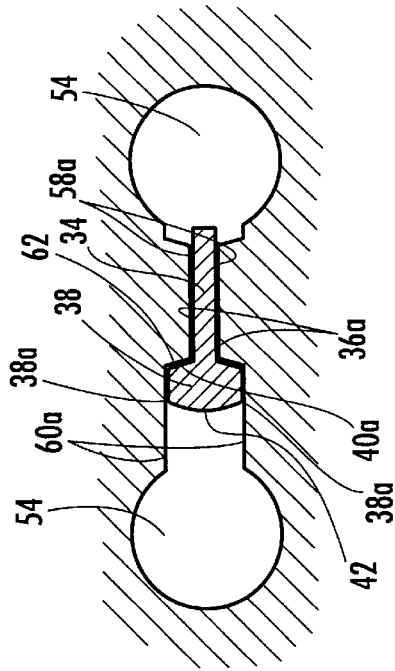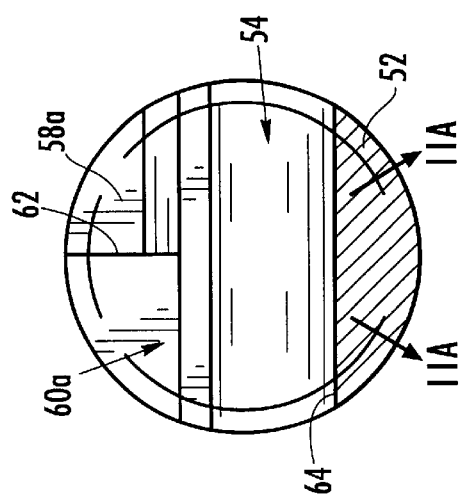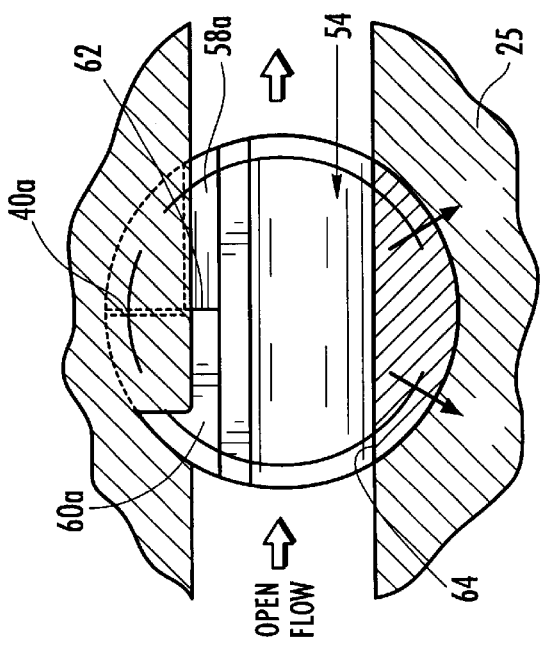

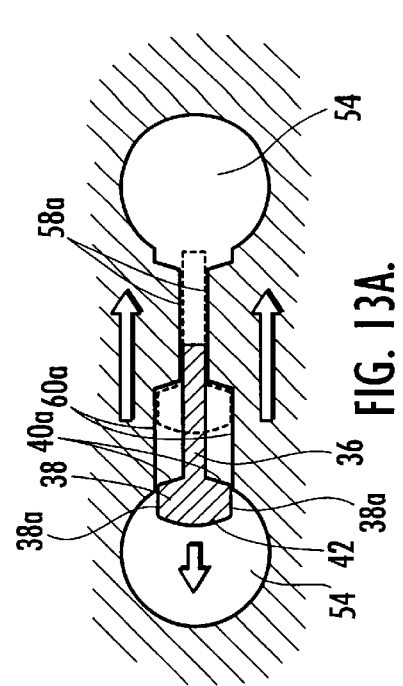
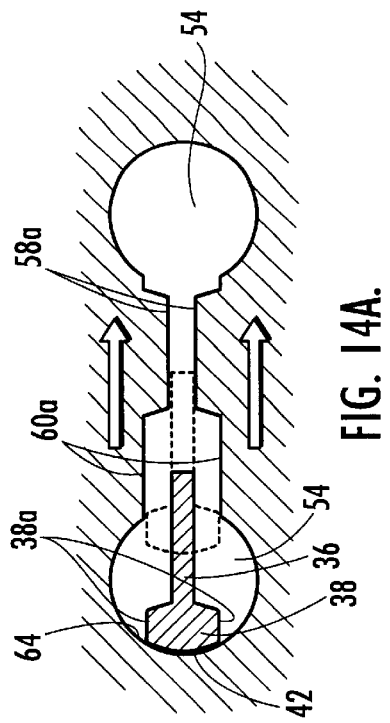
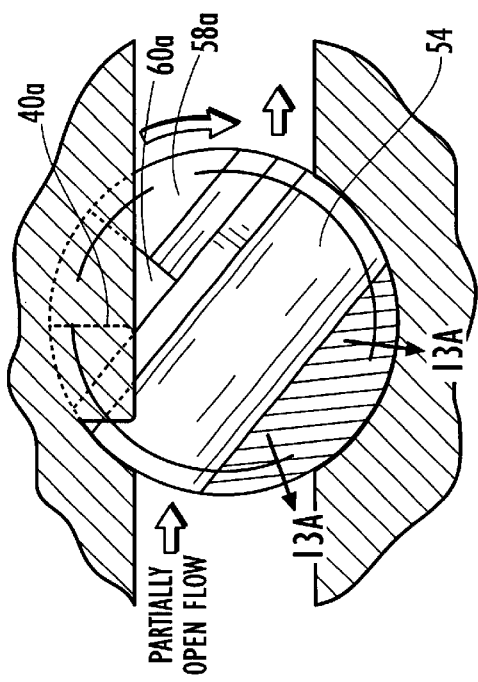
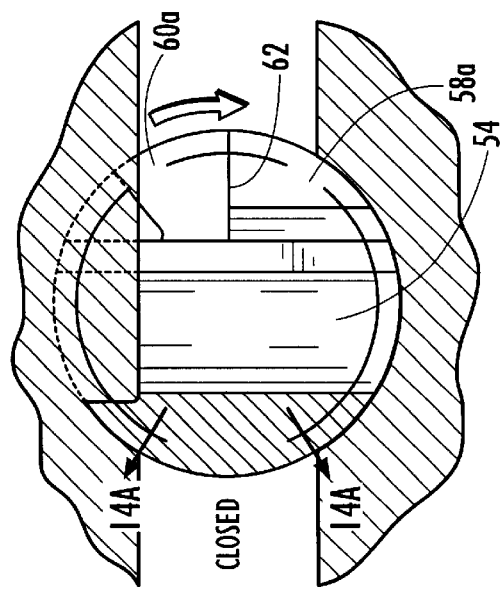

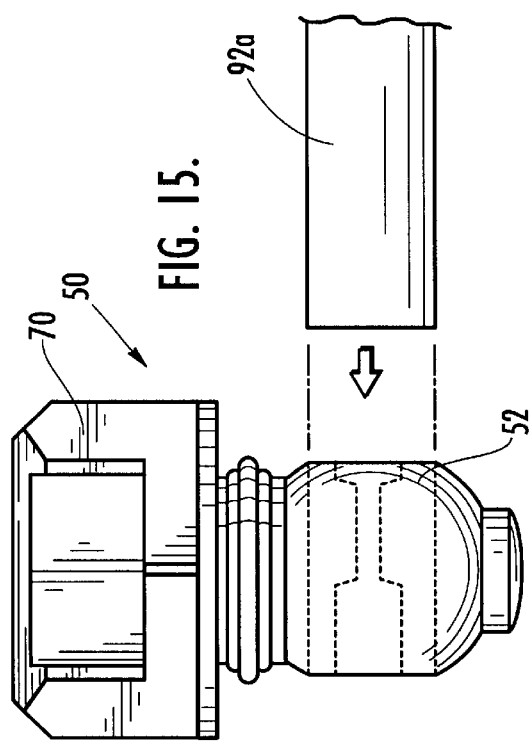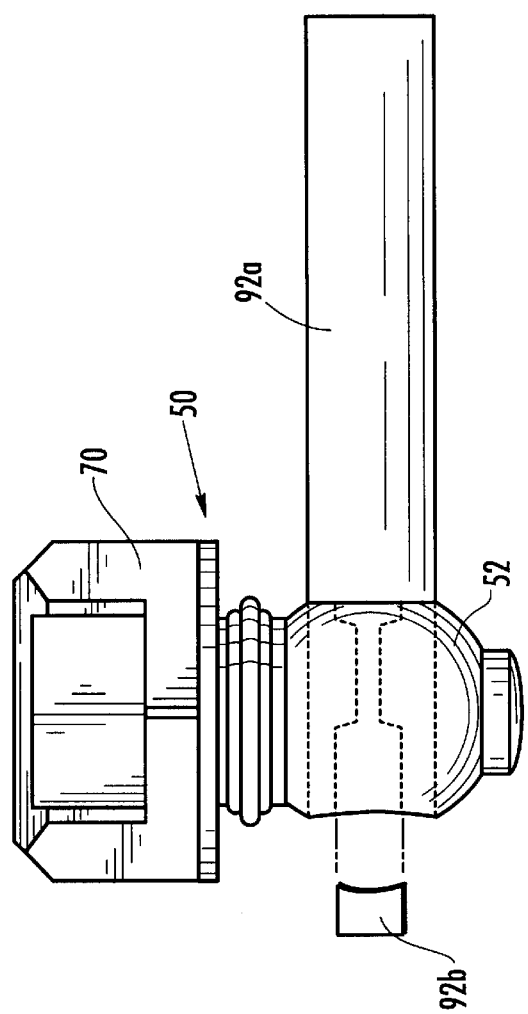

VALVE WITH ROTATABLE VALVE MEMBER AND METHOD FOR FORMING SAME

FIELD OF THE INVENTION

The present invention relates generally to valves, and more particularly to configurations of polymeric valves and methods for constructing them.

BACKGROUND OF THE INVENTION

Valves are common components of almost any piping system. Although they can be constructed in many different configurations and sizes, a typical valve will include a few basic elements. These include: a valve body that houses internal components within an internal cavity; inlet and outlet pipes leading to and from the valve body; and a valve member that is positioned within the cavity of the valve body. These components are attached such that fluid entering the valve through the inlet pipe is either allowed by the valve member to flow therethrough to the outlet pipe or prevented from such flow based on the position and/or orientation of the valve member within to the valve body.

In many instances, the valve member of a valve is a rotatable structure, such as a ball or frustoconical plug, that includes a passageway through which fluid can flow. Rotation of the valve member moves the passageway from an orientation aligned with the inlet and outlet pipes (in which fluid can pass through along a flow axis) and an orientation perpendicular to the flow axis (in which fluid flow is blocked). Often valves that employ a rotating valve member include structures on the valve member (or a component attached thereto, such as the valve stem or adapter) and the body that interact to control the degree of rotation of the valve member. For example, many valves are designed to rotate through only 90 degrees between the open and closed positions, with further rotation being prevented by stops located on the upper portion of the body and the lower surface of the adapter.

Valves can be formed of a variety of materials, including both metallic and polymeric materials. Valves formed of polymeric materials can be advantageous in many pipeline environments; they do not rust or corrode, they are typically lighter weight than metal valves, they can be quickly welded into place when the pipelines are also formed of a polymeric material, and often the pieces of the valve (and in particular the valve body) can be molded in an injection or compression molding process rather than requiring extensive machining.

Although they enjoy the foregoing advantages, polymeric valves typically require several assembly steps. Of course, the configuration of components formed of polymeric materials is limited by the practicalities of the molding process. As a consequence, if the valve body is injection or compression molded, it is generally molded in two or three separate pieces that are joined in a subsequent welding or fusion operation. The valve member and accompanying stem and adapter (which facilitate rotation of the valve member) are typically formed of separate pieces that are assembled in a subsequent operation (usually after the valve member has been placed inside the valve body pieces and they have been fused). All of these post-molding assembly steps can add cost to the finished valve. Also, it may be desirable that the valve include structure that halts rotation of the valve in desired positions; if so, these structures are also subject to the practical limitations of the molding process.

SUMMARY OF THE INVENTION

In view of the foregoing, it is an object of the present invention to provide a method of constructing a polymeric valve with reduced labor steps and cost.

It is also an object of the present invention to provide such a method that produces a polymeric valve that meets or exceeds the performance of currently produced polymeric valves.

It is an additional object of the present invention to provide such a method that produces a polymeric valve with stops that desirably limit rotation of the valve.

These and other objects are satisfied by the present invention, which is directed to a polymeric valve that can be produced by an insert-molding method. The method comprises the steps of: providing a mold comprising a pair of mating mold halves, with each of the mold halves including a mold cavity; providing a valve member-stem unit comprising a valve member of substantially circular cross-section attached to a stem, with the valve member including a passageway extending therethrough in a direction generally normal to the stem; inserting a mold core into the passageway of the valve member-stem unit to form a mold insert assembly; positioning the mold insert assembly within the cavity of a first of the mold halves; positioning a second of the mold halves in adjacent contacting relationship with the first mold half such that the mold insert assembly is located within the mold cavities of the first and second mold halves; injecting a polymeric material into the mold half cavities such that a valve casing forms around and captures the valve member-stem unit; and removing the valve casing, the valve member-stem unit and the mold core from the mold halves. With this method, the casing of the valve can be formed around the ball-stem unit during molding so that the product of the molding steps is ready for use.

As another aspect of the present invention, a preferred valve that can be formed by the aforementioned method comprises: a casing including a body having an internal cavity, an inlet attached to the body and an outlet attached to the body opposite the inlet; and a valve member being positioned at least partially within the cavity and having an outer surface of substantially circular cross-section. The valve member includes a passageway extending diametrically across its substantially circular cross-section and has an axis of rotation extending substantially normal to the passageway. The valve member further includes a slot extending inwardly toward the passageway from the outer surface, the slot being defined by slot surfaces and being configured to receive a projection extending from a valve casing when said valve member is placed within a valve body and rotated about the axis of rotation. The slot is further configured such that a stop portion of at least one of the slot walls acts as a stop for halting rotation of the valve member relative to the valve body in a first rotative direction. The valve also comprises a stem attached to the valve member that extends away from the valve member along the axis of rotation. In this configuration, the valve member includes stops that interact with the projection of the casing to desirably limit rotation of the valve member, and can be formed with the method set forth hereinabove.

BRIEF DESCRIPTION OF THE DRAWINGS

FIG. 11 is a top section view of the ball-stem unit taken along lines 11—11 of FIG. 6.

FIG. 11A is a schematic illustration of the configuration of the passageway and slot of the ball-stem unit illustrated in FIG. 11.

FIG. 12 is a top section view of the ball-stem unit of FIG. 11 interacting with the stop member of the casing of FIG. 4 with the ball-stem unit in the open position.

FIG. 12A is a schematic illustration of the configuration of the passageway and slot of the ball-stem unit of FIG. 12 showing the interaction between the slot and the stop member of the casing.

FIG. 13 is a top section view of the ball-stem unit and casing of FIG. 12 with the ball-stem unit rotated 45 degrees clockwise to the partially closed position.

FIG. 13A is a schematic illustration of the configuration of the passageway and slot of the ball-stem unit of FIG. 13 interacting with the stop member of the casing.

FIG. 14 is a top section view of the ball-stem unit and casing of FIG. 12 with the ball-stem unit rotated 90 degrees clockwise from its position in FIG. 12 to a fully closed position.

FIG. 14A is a schematic illustration of the interaction between the passageway and slot of the ball-stem unit and the stop member of the casing in the closed position of FIG. 14.

FIG. 15 is a front view showing the insertion of a mold core into the ball-stem unit of FIG. 6 prior to molding.

FIG. 16 is a front view of the ball-stem unit of FIG. 15 with one mold core fully inserted and a small mold insert being inserted.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
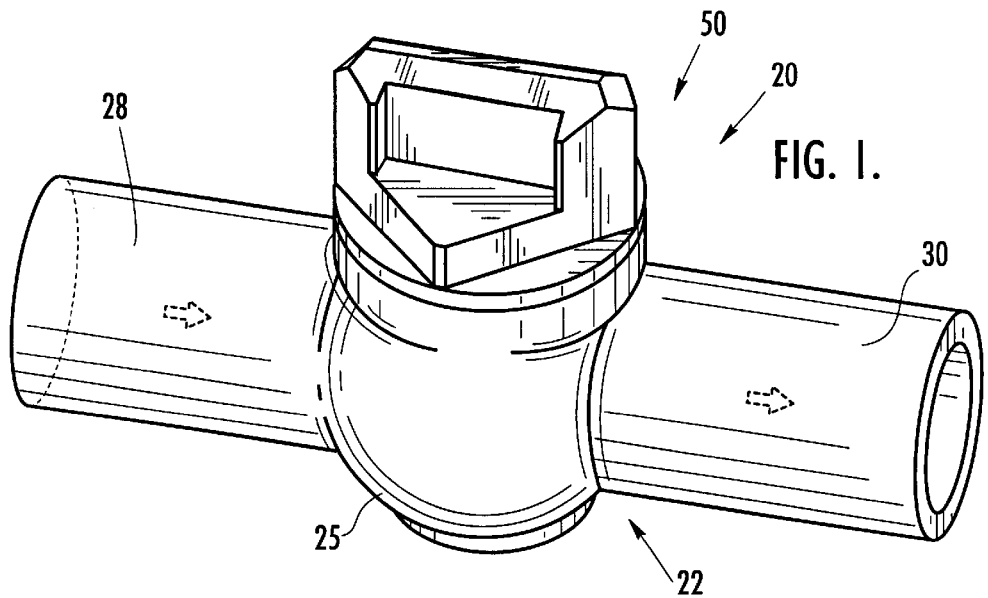
FIG. 1 is a perspective view of a valve of the present invention.
Figure 2:
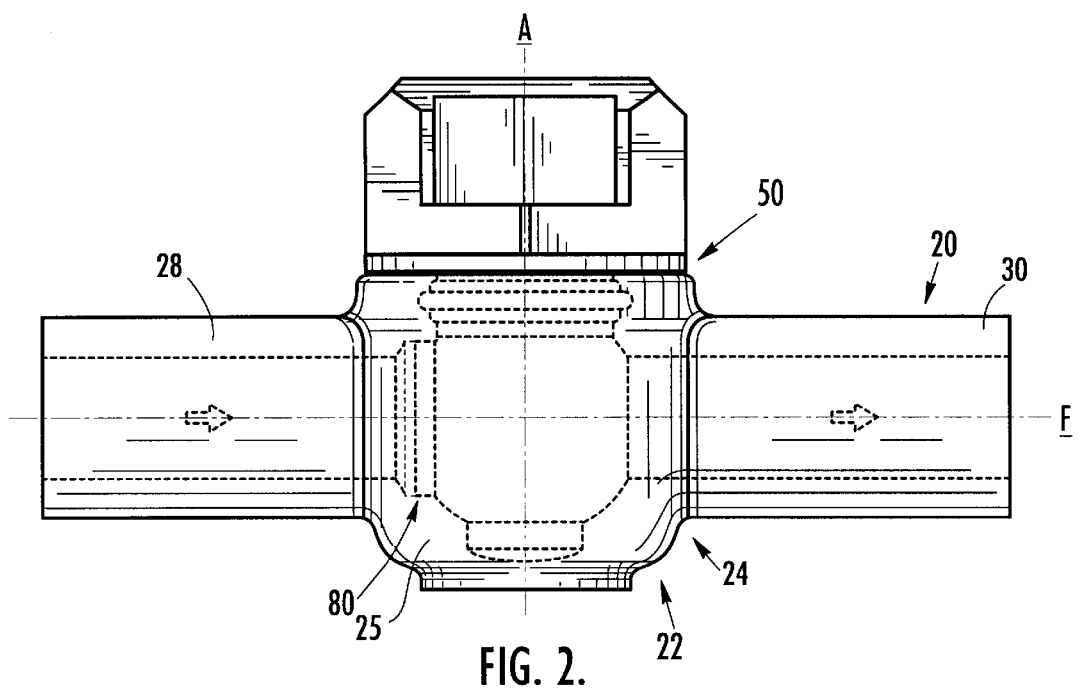
FIG. 2 is a front view of the valve of FIG. 1.
Figure 3:
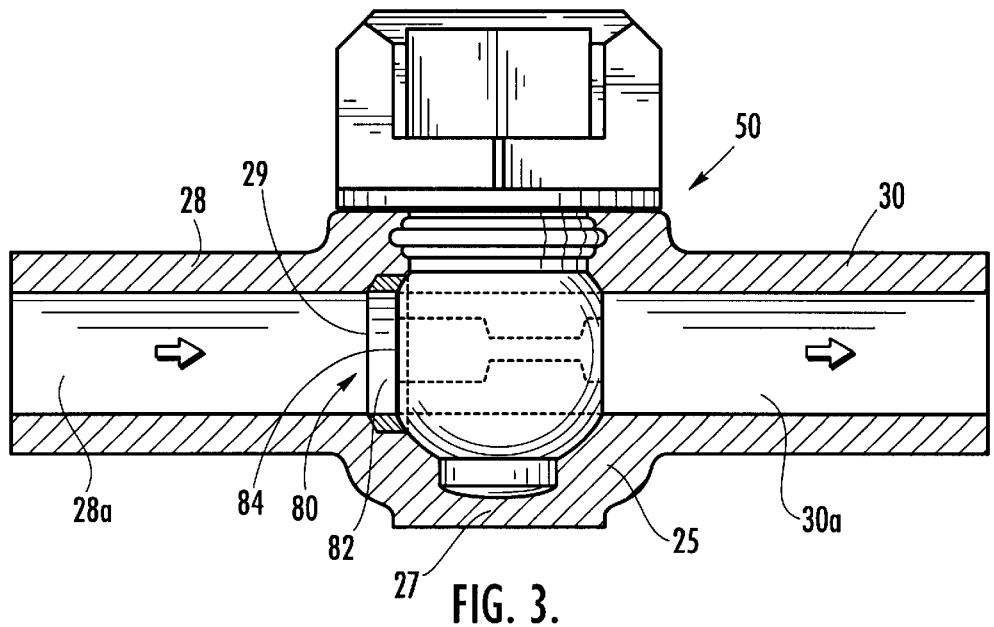
FIG. 3 is a front section view of the valve of FIG. 1.

Referring now to the figures, a ball valve, designated broadly at 20, is shown in FIGS. 1 through 3. The valve 20 generally includes a casing 22, a ball-stem unit 50, and a seat unit 80. These components are described in greater detail below.

Figure 4:
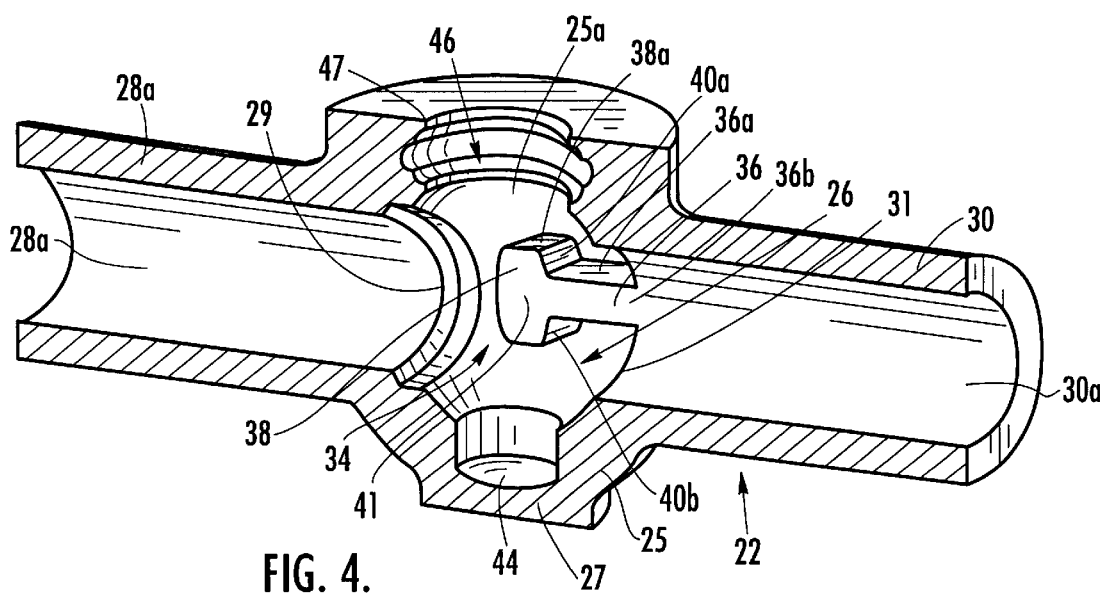
FIG. 4 is a front right perspective section view of the casing of the valve of FIG. 1.
Figure 5:
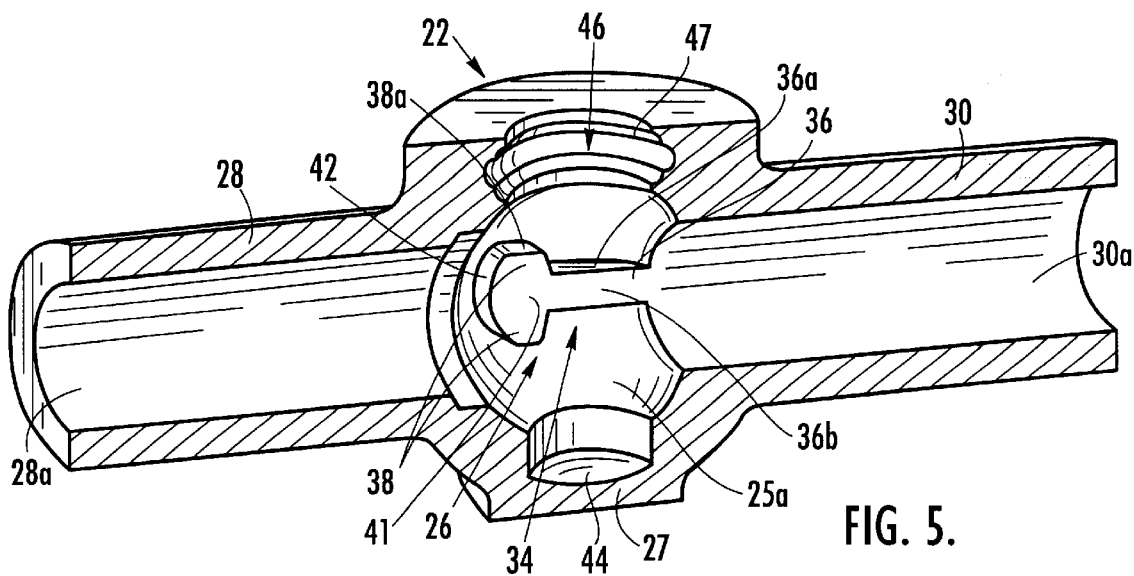
FIG. 5 is a front left perspective section view of the casing of the valve of FIG. 1.
Figure 6:
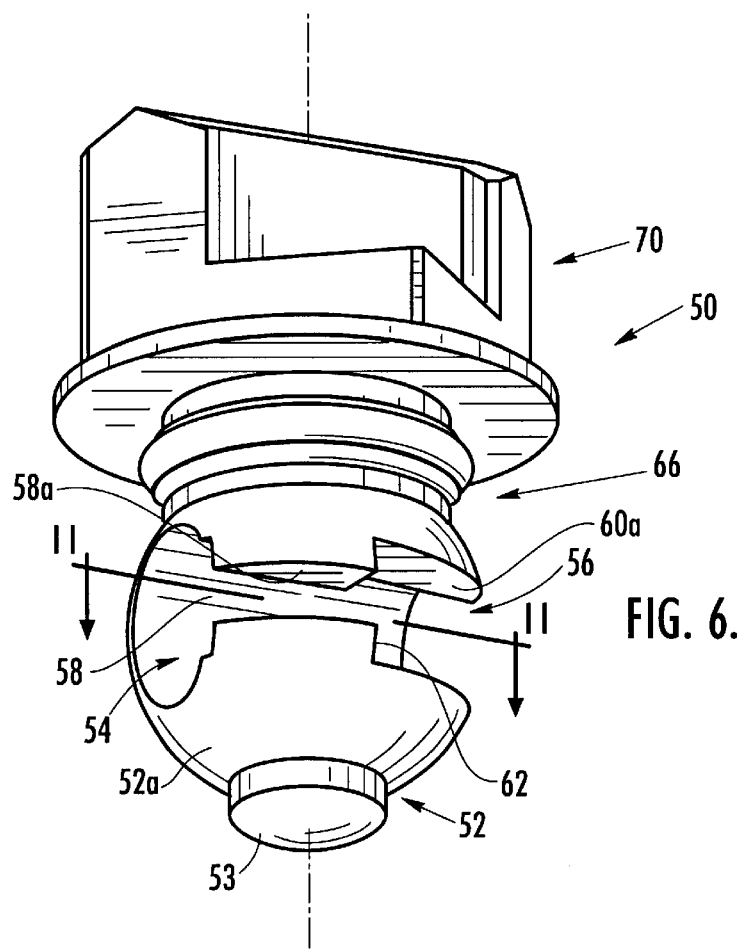
FIG. 6 is a bottom right rear perspective view of the ball-stem unit of the valve of FIG. 1.

The casing 22, seen best in FIGS. 3 through 5, includes a body 24 comprising a generally spherical wall 25, a inlet pipe 28, and an outlet pipe 30. The body wall 25 has an internal surface 25a that, along with an attached floor 27, defines an internal valve cavity 26. The inlet pipe 28 is hollow and is attached at one end to the wall 25 such that the lumen 28a of the inlet pipe 28 is in fluid communication with the cavity 26 via an inlet 29. Similarly, the outlet pipe 30 is hollow and is attached at one end to the wall 25 such that the lumen 30a of the outlet pipe 30 is in fluid communication with the cavity 26 via an outlet 31. Together, the inlet and outlet pipes 28, 30 define a flow axis F for fluid flow. The inlet 29 and outlet 31 are located at generally opposite positions from one another across the cavity 26 and are typically of approximately the same diameter. A circular recess 44 is located in the floor 27. A stem aperture 46 is located above the cavity 26; two grooves 47 encircle the portions of the wall 25 that define the stem aperture 46.

Referring now to FIGS. 4 and 5, a stop member 34 projects from the internal surface 25a of the wall 25. The stop member 34 is generally T-shaped and includes a generally horizontal trunk 36 that extends from the outlet 31 toward the inlet 29. The trunk 36 includes horizontal surfaces 36a (only one of which is illustrated herein) and a vertical surface 36b that merges smoothly with the inner surface of the inlet pipe 30. Two ears 38 extend vertically in opposite directions from the end of the trunk member 36 located away from the outlet 31. The ears 38 include horizontal surfaces 38a (only one of which is shown herein), vertical contact surfaces 40a, 40b that extend between the horizontal surfaces 38a and the horizontal surfaces 36a of the trunk 36 and generally face the outlet 31, an arcuate, generally vertically disposed contact surface 42 that extends between the horizontal surfaces 38a and generally faces the inlet 29, and a vertical surface 41 that merges with the vertical surface 36b.

As will be discussed in greater detail hereinbelow, preferably the casing 22 is formed of a polymeric material, such as polyethylene, polypropylene or the like. It is also preferred that the casing 22 be formed in an injection molding process, and that the stop member 34 be formed simultaneously with the remainder of the casing 22 as an integral unit.

Referring now to FIGS. 6 through 10, the ball-stem unit 50, which resides within and extends above the casing cavity 26, includes a ball 52, a stem 66, and an adapter 70. The ball 52 is generally spherical; it includes a knob 53 at its lower end that fits within the recess 44 of the casing floor 27, and it is attached to the stem 66 at its upper end. A passageway 54 extends horizontally and diametrically through the ball 52. The passageway 54 is illustratively and preferably approximately the same diameter as the inlet 29 and outlet 31.

A generally horizontal slot 56 is included in the ball 52 that begins at one lateral edge of the passageway 54 and extends outwardly therefrom to the outer surface 52a of the ball 52, such that the passageway 54 is open from that side. The slot 56 includes a narrow portion 58 and an adjacent wide portion 60. The narrow portion 58 is defined by opposed horizontal surfaces 58a (only one of which is expressly illustrated in FIG. 6) and terminates on one end at the passageway 54 and at the other end at vertical step surfaces 62. The wide portion 60 is defined by opposed horizontal surfaces 60a (only one of which is expressly illustrated in FIG. 6) and terminates at one end at the passageway 54 and at the other end at the vertical step surfaces 62.

Preferably, the outer surface 52a of the ball 52 is sized to fit snugly within the inner surface 25a of the casing wall 25. The knob 53 should be sized to fit and rotate within the recess 44. The passageway 54 should have a diameter larger than the width of the wide portion 60 of the slot 56 (wherein the width is measured between the horizontal surfaces 60a of the wide portion 60). The wide portion 60 should be at least as wide as the distance between the horizontal surfaces 38a of the stop member ears 38. The narrow portion 58 should be at least as wide as the trunk 36 of the stop member 34, but should not be as wide as the distance between the horizontal surfaces 38a of the ears 38 (as with the wide portion 60, the width of the narrow portion 58 is measured between the horizontal surfaces 58a).

Those skilled in this art will appreciate that, although the illustrated ball configuration is preferred, other configurations for the valve member 52 of the valve 20 may also be used. For example, the present invention can encompass frustoconical, conical, or cylindrical plugs or other valve members of substantially circular cross-section (such as ovoid and semi-ovoid configurations), as the principles behind the present invention are equally applicable to these and other additional configurations.

The stem 66 is circular in cross-section, is fixed to the upper end of the ball 52 opposite the knob 53, and extends upwardly from the ball 52 through the stem aperture 46. The stem 66 is sized to fit snugly and rotate within the stem aperture 46. The stem 66 and knob 53 define an axis of rotation A for the ball-stem unit 50 that is substantially normal to the flow axis F. The stem 66 includes two circular ridges 68 between which an O-ring 69 resides; these ridges 68 fit within the grooves 47 of the stem aperture 46.

The adapter 70 is fixed to the upper end of the stem 66. As illustrated herein, the adapter 70 includes a square block 72 and an upper rib 74. An adapter of this configuration enables an operator to use either a square wrench or a T-wrench to turn the adapter 70 (and, in turn, the ball 52) to open or close the valve 70. This adapter is described in greater detail in co-pending and co-assigned U.S. patent application Ser. No. 09/316,819 filed concurrently and entitled VALVE INCLUDING VALVE ADAPTER AND STOP ASSEMBLY the disclosure of which is hereby incorporated herein by reference in its entirety. Those skilled in this art will recognize that, although the illustrated adapter configuration is preferred, any other adapter configuration that enables an operator to rotate the ball 52 between open and closed positions can also be employed with the present invention.

Illustratively and preferably, the ball-stem unit 50 is formed as an integral unit, although multiple pieces may be employed. It is also preferred that the ball stem-unit 50 be formed of a polymeric material, such as polypropylene, acetal, and the like, and that it be injection molded. It is further preferred that the ball-stem unit so be formed of a material that does not deform at the molding temperatures of the material of the casing 22.

Figure 7:
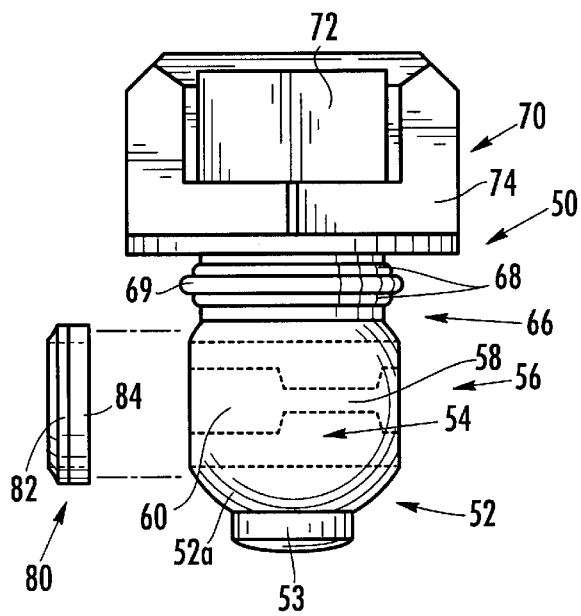
FIG. 7 is a front view of the ball-stem unit of FIG. 6 with the seat unit shown in exploded form.
Figure 8:
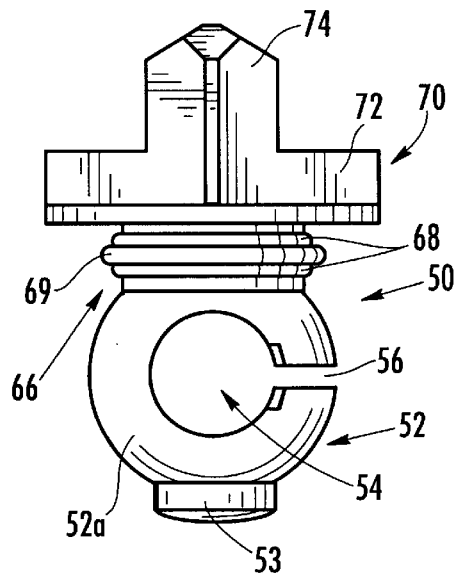
FIG. 8 is a right side view of the ball-stem unit of FIG. 6.
Figure 9:
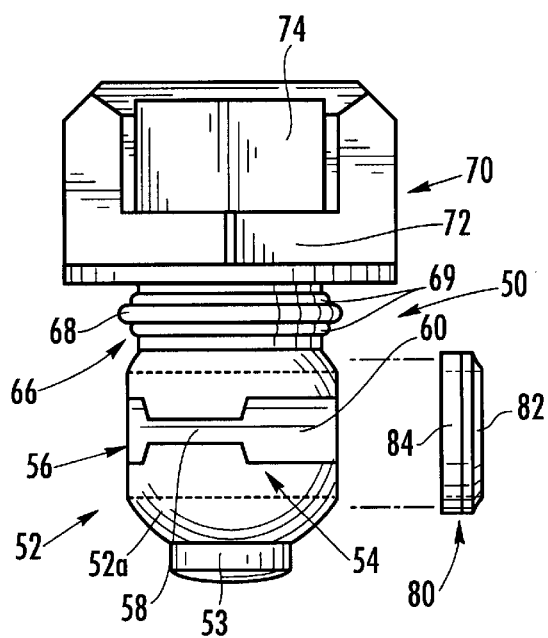
FIG. 9 is a rear view of the ball-stem unit of FIG. 6 with the seat unit shown in exploded form.
Figure 10:
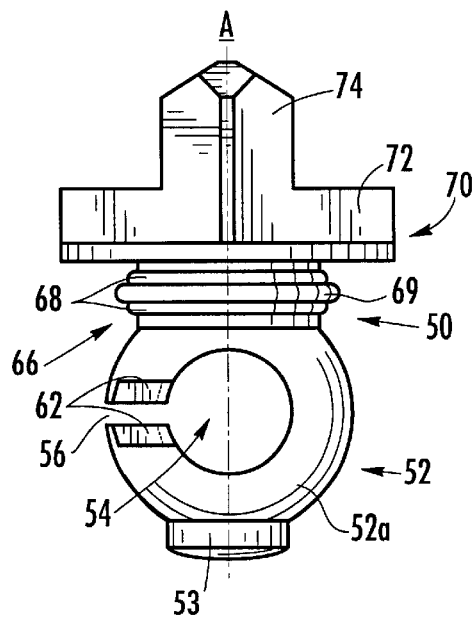
FIG. 10 is a left side view of the ball-stem unit of FIG. 6.

Referring to FIGS. 3, 7 and 9, the seat unit 80 comprises a ring-shaped seat retainer 82 and a seat layer 84. The seat retainer 82 is sized and positioned such that its opening encircles the inlet 31. The seat layer 84, which should be formed of a compressible material, overlies the surface of the seat retainer 82 that rests upon the outer surface 52a of the ball 52. The seat layer 84 may be formed as a separate component for the seat retainer 82, in the manner of a gasket, or may be a layer of material that is adhered to the seat retainer 82 in the manner of a coating. The interaction between the seat layer 84 and the ball 52 provides a fluid-tight seal between these components when the ball 52 is in the closed position.

Like the ball-stem unit 50, it is preferred that, if the casing 22 is injection molded of a polymeric material, the seat retainer 82 and the seat layer 84 be formed of a material that does not deform at the molding temperature of the material of the casing 22. For example, if the casing 22 is formed of polyethylene, the seat retainer 82 may be formed of acetal or polypropylene, and the seat layer 84 may be formed of Buna N or Viton®.

In operation, the valve 20 can be moved between an open position (see, for example, FIGS. 2 and 12) and a closed position (see, for example, FIG. 14) through rotation of the adapter 70 relative to the casing 22. In the open position, the passageway 54 of the ball 52 is oriented such that it is substantially parallel with the flow axis F defined by the inlet and outlet pipes 28, 30. As shown in FIGS. 12 and 12A, the slot 56 of the ball 52 is positioned such that it surrounds the stop member 34 of the casing 22, with the horizontal surfaces 58a of the narrow portion 58 in adjacent relationship with the horizontal surfaces 36a of the trunk 36, and with the horizontal surfaces 60a of the wide portion 60 of the slot 56 in adjacent relationship with the horizontal surfaces 38a of the ears 38. The relationship of these components is illustrated in two-dimensional schematic form in FIG. 12A, which represents the passageway 54 and slot 56 interacting with the stop member 34. The contact surfaces 40a of the ears 38 contact the step surfaces 62 of the slot 56, thereby preventing the ball 52 from additional rotation in the counterclockwise direction as seen in FIG. 12.

Those skilled in the art will appreciate that other projection and slot configurations can also be employed with the present invention. For example, the stop member 34 may include only a single ear 38, with the wide position 60 of the slot 56 being narrowed in a corresponding manner. It is also contemplated that the slot 56 may not be contiguous with the passageway 54. Further, the trunk 36 may be omitted altogether; in that instance, the narrow portion 58 of the slot 56 may also be omitted. Irrespective of the configuration selected, it is preferred that the interaction between the slot of the valve member and the projection on the casing limit rotation of the valve member within a range of 75 to 105 degrees, with a rotative range of about 90 degrees being more preferred.

To move the ball 52 to the closed position from the open position, the operator rotates the adapter 70 relative to the casing 22 (in a clockwise direction as viewed from above, as in FIGS. 12 through 14), which in turn rotates the stem 66 and the ball 52 clockwise about the axis A (see FIGS. 13 and 13A, which show the ball 52 in a partially open position). Rotation ceases as the ball 52 reaches the closed position, in which the passageway 54 is oriented to be substantially perpendicular to the flow axis F (see FIGS. 14 and 14A). In the closed position, a contact surface 64 located on an interior edge portion of the passageway 54 opposite the wide portion 60 of the slot 56 is in contact with the contact surface 42 of the stop member 34, thereby preventing further rotation of the ball 52, stem 66 and adapter 70 in the clockwise direction. The relative movement of the stop member 34, the passageway 54 and the slot 56 as they move toward and to the closed position is schematically illustrated in two dimensions in FIGS. 13A and 14A.

Although the ball 52 is generally spherical, it is preferred that the ball 52 be slightly greater in diameter in the horizontal dimension normal to the passageway 54 than in the horizontal dimension parallel to the passageway 54. In such a configuration, the ball 52 can press against the seat layer 84 with greater pressure in the closed position than in the open position, thus creating a tighter seal in the closed position (when the integrity of the seal is more important).

Figure 17:
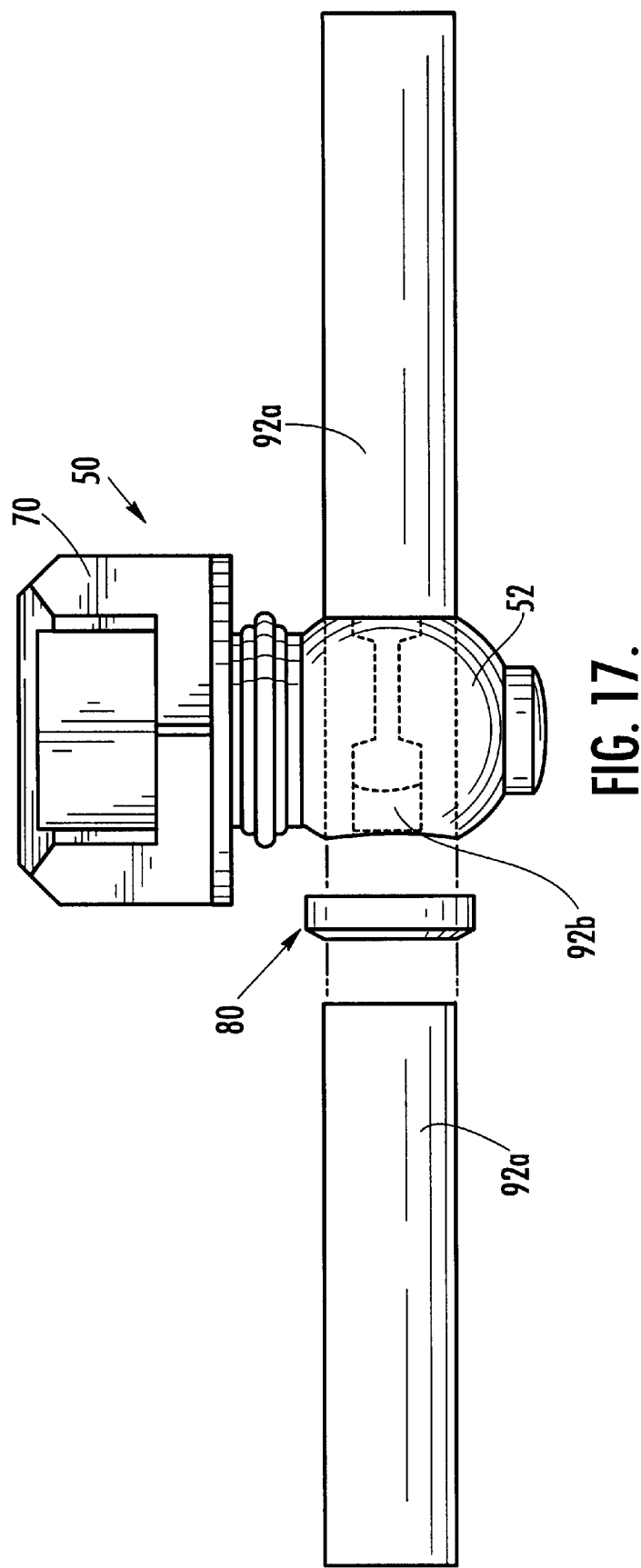
FIG. 17 is a front view of the ball-stem unit, the seat unit and mold core of FIG. 16 with one mold core and the small mold insert fully inserted and a second mold core being inserted.
Figure 18:
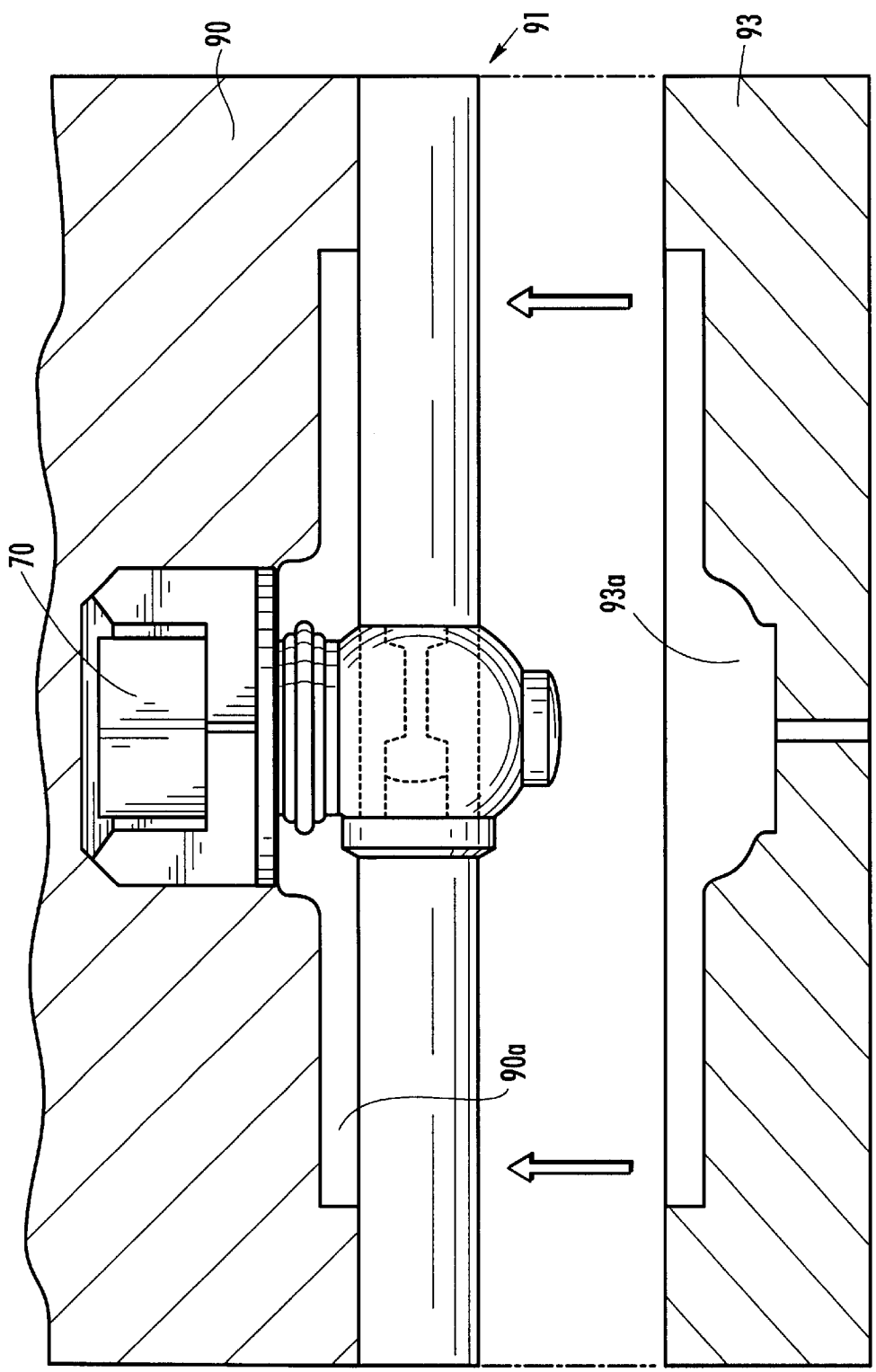
FIG. 18 is a front section view of the ball-stem unit, seat unit, mold cores and small mold insert of FIG. 17 positioned between two separated mold cavities.
Figure 19:
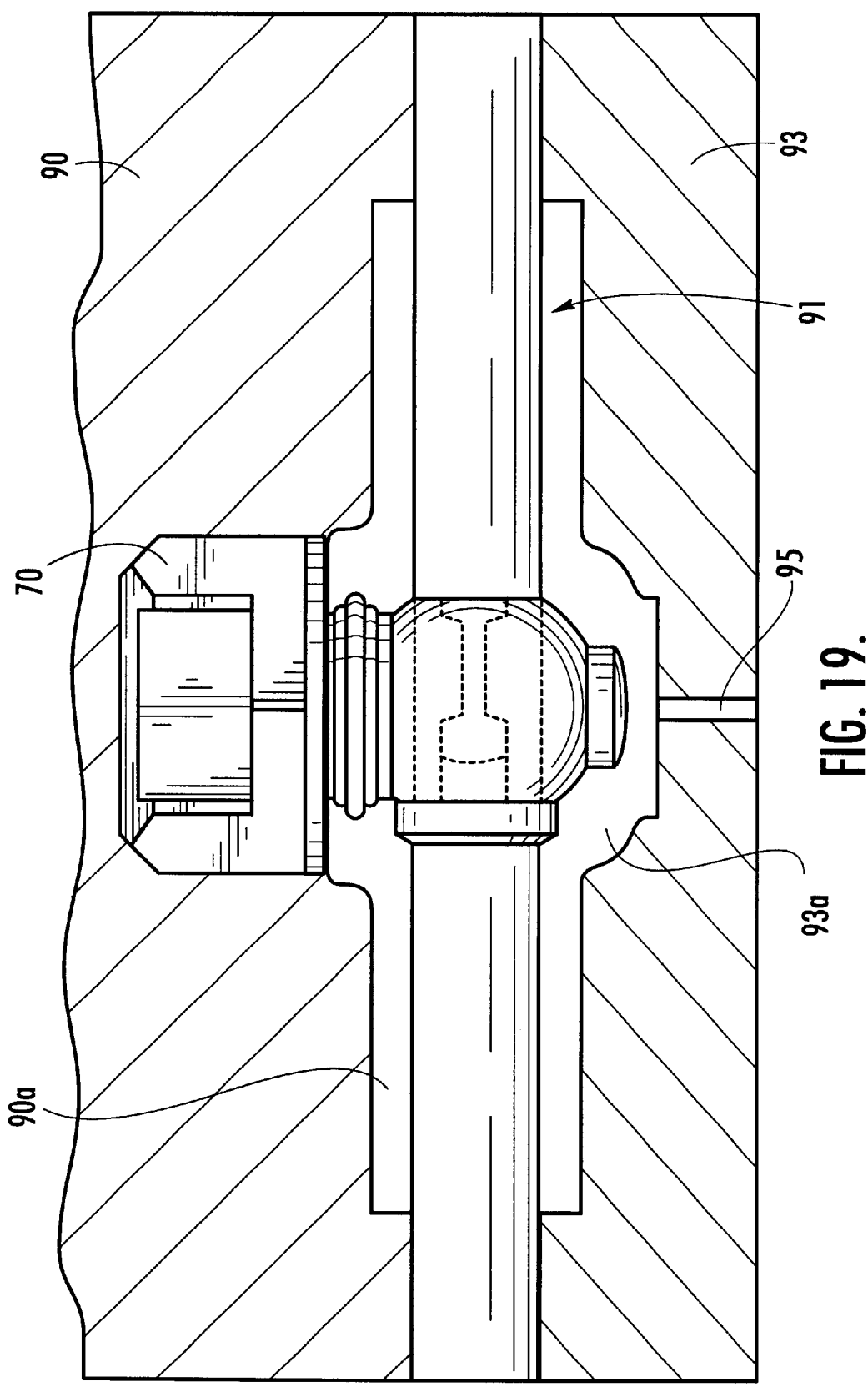
FIG. 19 is a front section view of the molding operation of FIG. 18 with the mold cavities in a closed position.
Figure 20:
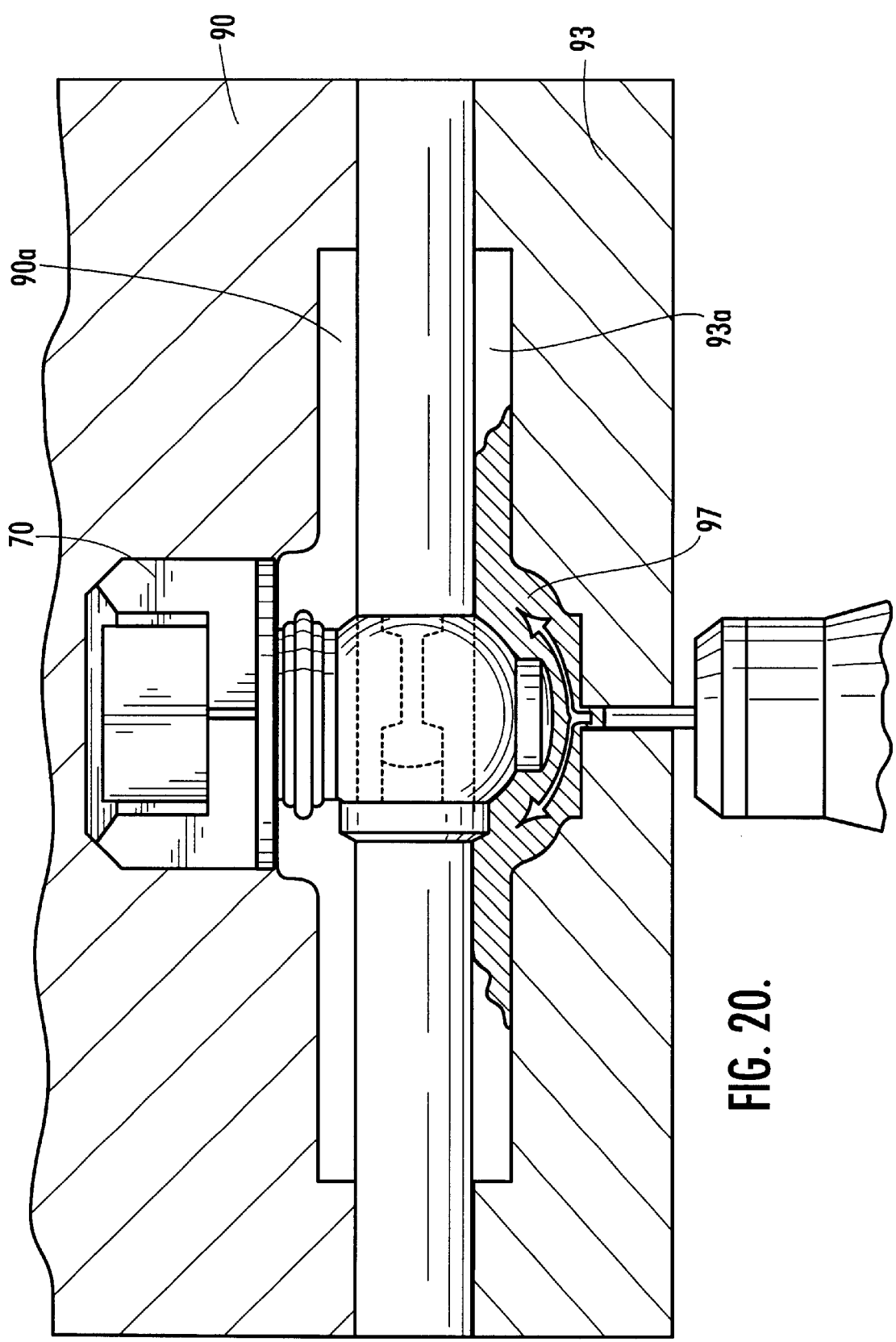
FIG. 20 is a front section view of the closed mold cavities of FIG. 19 illustrating the injection of molten polymeric material into the mold cavities.
Figure 21:
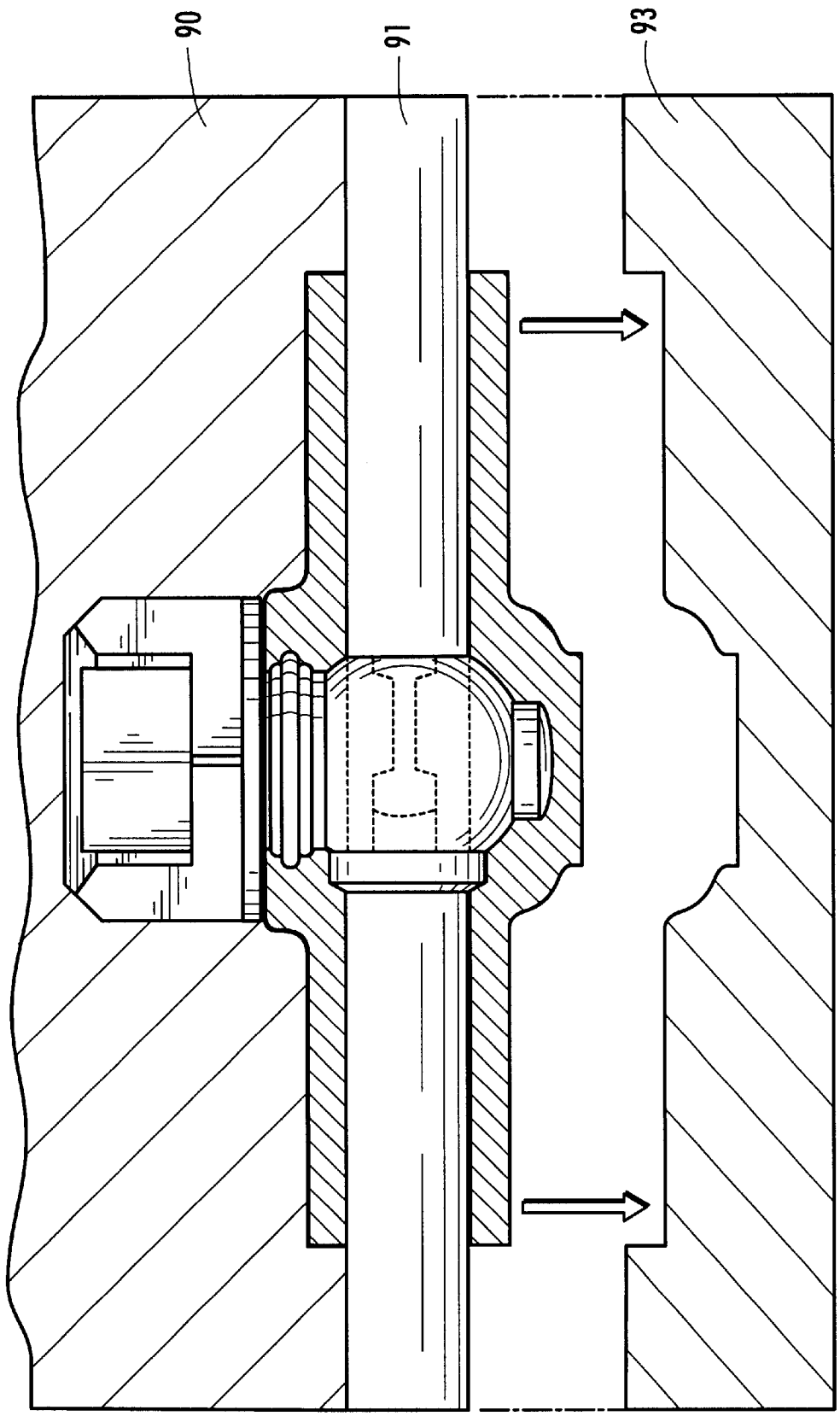
FIG. 21 is a front view of the molds of FIG. 20, wherein the mold cavities have been completely filled and the mold halves have separated.
Figure 22:
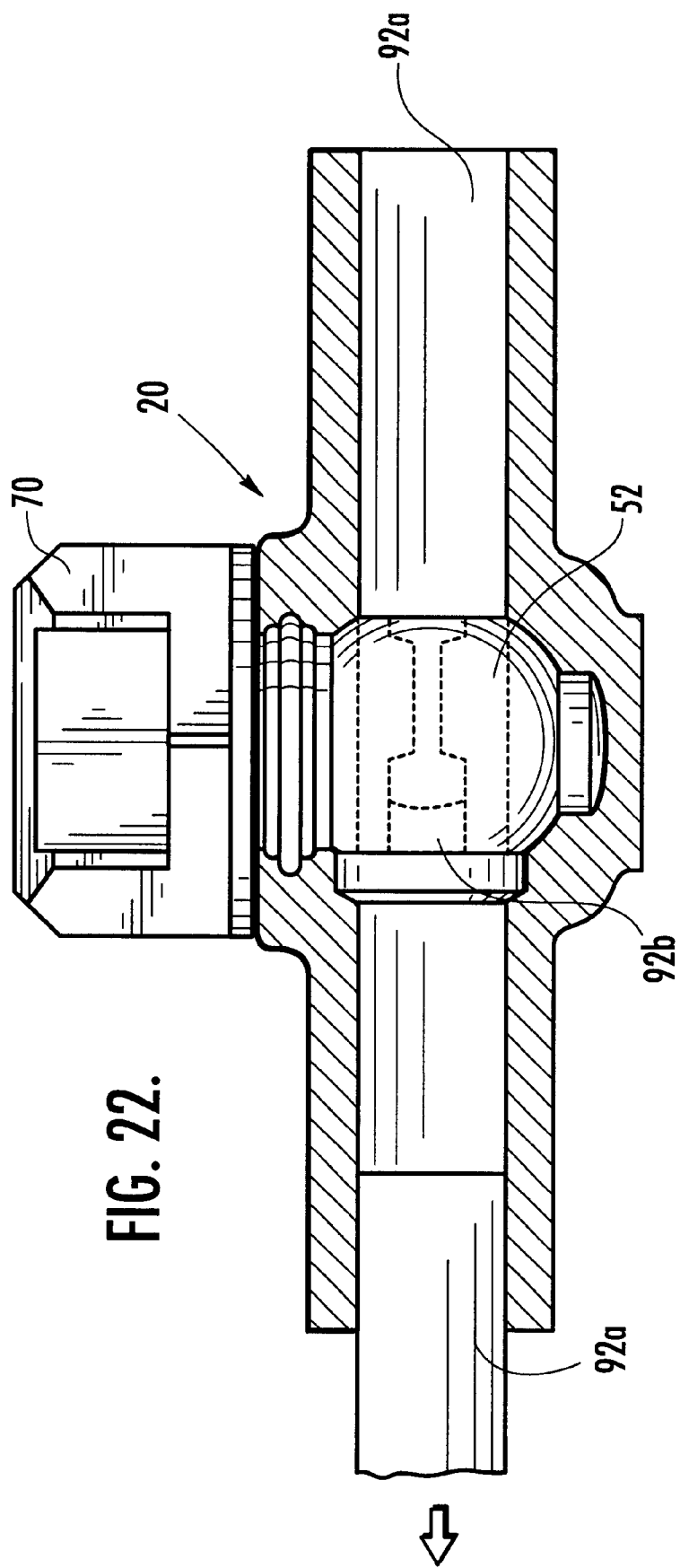
FIG. 22 is a front section view of the valve molded in FIG. 21 showing the removal of one mold core from the valve.

FIGS. 15 through 22 illustrate a method of constructing the valve 20 through an injection molding process. First, a cylindrical mold core 92a is inserted through the seat unit 80 and the passageway 54 of the ball 52. (FIG. 15). The mold core 92a fills the passageway 54, but does not fill the slot 56. The mold core 92a can be formed of any material typically used in the injection molding of polymeric materials, but is preferably steel. A small mold insert 92b is then inserted in the wide portion 60 of the slot 56 (FIG. 16). The seat unit 80 is then placed in contact with the ball 52, and a second mold core 92a is inserted into the seat retainer 82 to form a mold insert assembly 91 (FIG. 17). The mold insert assembly 91 is then positioned within a cavity 90a of a mold half 90, with the adapter 70 fitting flush against the walls of the cavity 90a (FIG. 18) and the ends of the mold cores 92a, 92b fitting within recesses in the mold half 90. A mating mold half 93 having a cavity 93a is then positioned opposite the mold half 90 and brought into contact with the mold half 90 such that the cavities 90a, 93a are contiguous (FIG. 19). Molten polymeric material 97 is injected through a sprue 95 that is in fluid communication with the mold cavity 93a, and the polymeric material 97 fills the portions of the cavities 90a, 93a that are not occupied by the insert assembly 91 to form the casing 22 (FIG. 20). Thus, the wall 25, the floor 27, the inlet pipe 28, the outlet pipe 30, and the stop member 34 are formed by the injected polymeric material 97 as it flows around the mold insert assembly 91. Once the unoccupied space has been filled and the polymeric material 97 has solidified sufficiently for handling, the mold half 93 retracts (FIG. 21), and the finished valve 20 and the mold core 92 are removed from the valve 20 (FIG. 22). The finished valve 20 is then ready for use.

Notably, and as demonstrated by the foregoing discussion, the valve 20 can be constructed in an injection molding process that requires no post-molding assembly steps to enable the valve to operate. The ball-stem unit can be formed as an integral component, then included in the valve without additional steps to assemble separate portions of the casing. Further, the injection molding of the valve with the ball-stem insert can produce stops for the ball to halt rotation of the ball at desired points. As such, the valve and construction method of the present invention solves problems presented by prior art valves.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein. In the claims, means-plus-function clauses are intended to cover the structures described herein as performing the recited function and not only structural equivalents but also equivalent structures.

That which is claimed is:

1. A valve, comprising:

a casing including a body having an internal cavity, an inlet attached to said body and an outlet attached to said cavity, said casing further including a projection extending from said body into said cavity;

a valve member being positioned at least partially within said cavity and having an outer surface of substantially circular cross-section of said valve member, said valve member having an axis of rotation extending substantially normal to said passageway, said valve member further including a slot extending inwardly toward said passageway from said outer surface, said slot being defined by slot surfaces and being configured to receive said projection when said valve member is rotated about said axis of rotation, said slot further being configured such that a stop portion of said at least one of said slot walls acts as a stop for halting rotation of said valve member relative to the valve body in a first rotative direction;

a stem attached to said valve member, said stem extending away from said valve member along said axis of rotation;

wherein said slot and said passageway contiguous.

2. The valve defined in claim 1, wherein said valve member and stem form a unitary structure.

3. The valve defined in claim 1, further comprising an adapter configured to receive a torquing tool to facilitate rotation of said valve member within the valve body.

4. The valve defined in claim 3, wherein said valve member, said stem, and said adapter form a unitary structure.

5. The valve defined in claim 1, wherein said slot and said passageway are configured such that said stop portion of said slot walls is between about 75 and 105 degrees about said axis of rotation from an edge portion of said passageway of substantially similar elevation configured to act as a stop in a second rotative direction opposite said first rotative direction.

6. The valve defined in claim 1, wherein said slot surfaces define a stepped slot having a wide portion and a narrow portion, and wherein said slot surface stop portion is at least one step wall dividing said thick and thin portions.

7. The valve defined in claim 6, wherein said casing includes a stop member having stop surfaces configured to contact said step surfaces of said slot and thereby halt rotation in said first rotative direction of said valve member-stem unit relative to said casing.

8. The valve defined in claim 7, wherein said stop member includes a trunk extending substantially parallel to said passageway and at least one ear connected with said trunk extending generally in a direction normal to said trunk.

9. A valve member and stem unit for use in a valve, comprising:

a valve member having an outer surface of substantially circular cross-section, said valve member including a passageway extending diametrically across the substantially circular cross-section of said valve member, said valve member having an axis of rotation extending substantially normal to said passageway, said valve member further including a slot extending inwardly toward said passageway from said outer surface, said slot being defined by slot surfaces and being configured to receive a projection from a valve body when said valve member is placed within the valve body and rotated about said axis of rotation, said slot further being configured such that a stop portion of said at least one of said slot walls acts as a stop for halting rotation of said valve member relative to the valve body in a first rotative direction; and a stem attached to said valve member, said stem extending away from said valve member along said axis of rotation;

wherein said slot and said passageway are contiguous.

10. A valve member and stem unit for use in a valve, comprising:

a valve member having an outer surface of substantially circular cross-section, said valve member including a passageway extending diametrically across the substantially circular cross-section of said valve member, said valve member having an axis of rotation extending substantially normal to said passageway, said valve member further including a slot extending inwardly toward said passageway from said outer surface, said slot being defined by slot surfaces and being configured to receive a projection from a valve body when said valve member is placed within the valve body and rotated about said axis of rotation, said slot further being configured such that a stop portion of said at least one of said slot walls acts as a stop for halting rotation of said valve member relative to the valve body in a first rotative direction; and a stem attached to said valve member, said stem extending away from said valve member along said axis of rotation;

wherein said slot surfaces define a stepped slot having a wide portion and a narrow portion, and wherein said slot surface stop portion is at least one step wall dividing said thick and thin portions.

11. The valve member and stem unit defined in claim 9, wherein said valve member and said stem form a unitary structure.

12. The valve member and stem unit defined in claim 9, further comprising an adapter configured to receive a torquing tool to facilitate rotation of said valve member within the valve body.

13. The valve member and stem unit defined in claim 12, wherein said valve member, said stem, and said adapter form a unitary structure.

14. The valve member an stem unit defined in claim 9, wherein said slot surfaces define a stepped slot having wide portion and a narrow portion, and wherein said slot surface stop portion is at least one step wall dividing said thick and thin portions.

15. The valve member and stem unit defined in claim 10, wherein said valve member and said stem form a unitary structure.

16. The valve member and stem unit defined in claim 10, further comprising an adapter configured to receive a torquing tool to facilitate rotation of said valve member within the valve body.

17. The valve member and stem unit defined in claim 16, wherein said valve member, said stem, and said adapter form a unitary structure.

* * * * *

UNITED STATES PATENT AND TRADEMARK OFFICE
CERTIFICATE OF CORRECTION

PATENT NO. : 6,260,820 B1
DATED : July 17, 2001
INVENTOR(S) : Chowdhury

It is certified that error appears in the above-identified patent and that said Letters Patent is hereby corrected as shown below:

<u>Column 8,</u>
Line 16, after "circular cross-section" the following should be inserted:

-- , said valve member including a passageway extending diametrically across the substantially circular cross section --

<u>Column 10,</u>
Line 18, should read:

-- 14. The valve member and stem unit defined in claim 9, --.

Signed and Sealed this

Second Day of April, 2002

*Attest:*

JAMES E. ROGAN
*Attesting Officer*     *Director of the United States Patent and Trademark Office*